United States Patent [19]

Shiozaki et al.

[11] Patent Number: 5,978,603
[45] Date of Patent: Nov. 2, 1999

[54] CAMERA

[75] Inventors: Toshikatsu Shiozaki, Akiruno; Takashi Inoue, Hachioji, both of Japan

[73] Assignee: Olympus Optical Co., Ltd., Tokyo, Japan

[21] Appl. No.: 09/149,792

[22] Filed: Sep. 8, 1998

[30]       Foreign Application Priority Data

Sep. 9, 1997   [JP]   Japan ..................................... 9-244378

[51] Int. Cl.$^6$ .................................................. G03B 15/03
[52] U.S. Cl. ............................................................ 396/177
[58] Field of Search ................................... 396/177, 176, 396/178

[56]            References Cited

U.S. PATENT DOCUMENTS 5,515,126   5/1996   Baxter et al. ............................. 396/178
5,852,752   12/1998  Nakanishi et al. ....................... 396/176

*Primary Examiner*—W. B. Perkey
*Attorney, Agent, or Firm*—Volpe and Koenig, P.C.

[57]             ABSTRACT

A camera according to the present invention comprises a camera body, a cover unit attached to the camera body so as to be rotatably opened and closed about a spindle, and a stop member provided to prevent the cover unit from rotating over a predetermined angle, wherein the cover unit is constituted by an inner cover and an outer cover integrally attached as a unit in a state where electric circuit components are interposed therebetween.

10 Claims, 3 Drawing Sheets

CAMERA

BACKGROUND OF THE INVENTION

The present invention relates to a camera, for example, an electronic camera in which an electric element, such as a stroboscopic light-emitting unit, is stored in an openable/closable cover unit attached to a camera body.

With reduction in size of a camera, e.g., an electronic camera, it becomes difficult to secure a space for an operating section and a display section. To achieve both size reduction and operability of a camera body, it is considered to store in the camera body an auxiliary function unit which is not normally used, and expose it only when it is used. For example, as regards a digital camera, a monitoring LCD device, a stroboscope, an auxiliary operating unit, etc. may be stored in an openable/closable cover unit.

More specifically, a so-called pop-up type stroboscope has been developed and put to practical use. In the pop-up type stroboscope, a stroboscopic light emitting unit is stored in the cover unit, and exposed out of the camera body only when the stroboscope is used.

The stroboscope has the following problems: as the camera body becomes compact, a space where the light emitting surface is set cannot be secured; and since the stroboscopic light emitting unit is located near the photographing optical axis, the "pink-eye effect" occurs. These problems, however, have been solved by the pop-up type stroboscope.

The openable/closable cover unit is mainly comprised of an upper cover and a lower cover. A spindle or a bearing for rotation is provided in either the upper or lower cover. Since the spindle does not have a sufficient mechanical strength, a stop member for preventing the cover unit from rotating over a predetermined angle is provided to support the spindle. One end of the stop member is rotatably supported by the camera body, and the other end is slid along a cam groove formed in the upper or lower cover of the cover unit.

Another problem is how to deal with a plurality of lead lines connecting electronic circuit components of the cover unit to the camera body. In particular, if the stroboscopic light emitting unit is stored in the cover unit, comparatively thick lead lines, instead of a flexible circuit board, are used for wiring. The thick lead lines may make large resistance, depending on the wiring path, when the openable/closable cover unit is rotated. Moreover, according to circumstances, the wiring material of the lead lines may be cut due to fatigue resulting from repeated rotating operations of the cover unit. Jpn. Pat. Appln. KOKAI Publication No. 8-184883 describes that the cover unit has therein a space for slack of lead lines required for rotation.

As described above, according to the conventional art, since a spindle or bearing and a cam groove is formed in either the upper or lower cover, the mold must have an undercut structure, requiring a slide mold. Therefore, the mold costs high. Further, if a space for slack of lead lines is provided in the cover unit, the volume and size of the cover unit itself are inevitably increased, resulting in contradiction to reduction in size of the camera.

BRIEF SUMMARY OF THE INVENTION

An object of the present invention is to provide a compact camera manufactured with a simple mold structure at a low cost, assembled easily, having high operability, and not requiring a space for slack of lead lines in the cover unit.

To achieve the above object, the camera of the present invention has the following constitution. The features of the present invention other than the following will be clarified in the description of the embodiments.

A camera of the present invention comprises a camera body, a cover unit attached to the camera body so as to be rotatably opened and closed about a spindle, and a stop member provided to prevent the cover unit from rotating over a predetermined angle, wherein the cover unit is constituted by an inner cover and an outer cover integrally attached as a unit in a state where electric circuit components are interposed therebetween.

DETAILED DESCRIPTION OF THE INVENTION

First Embodiment

Figure 1:
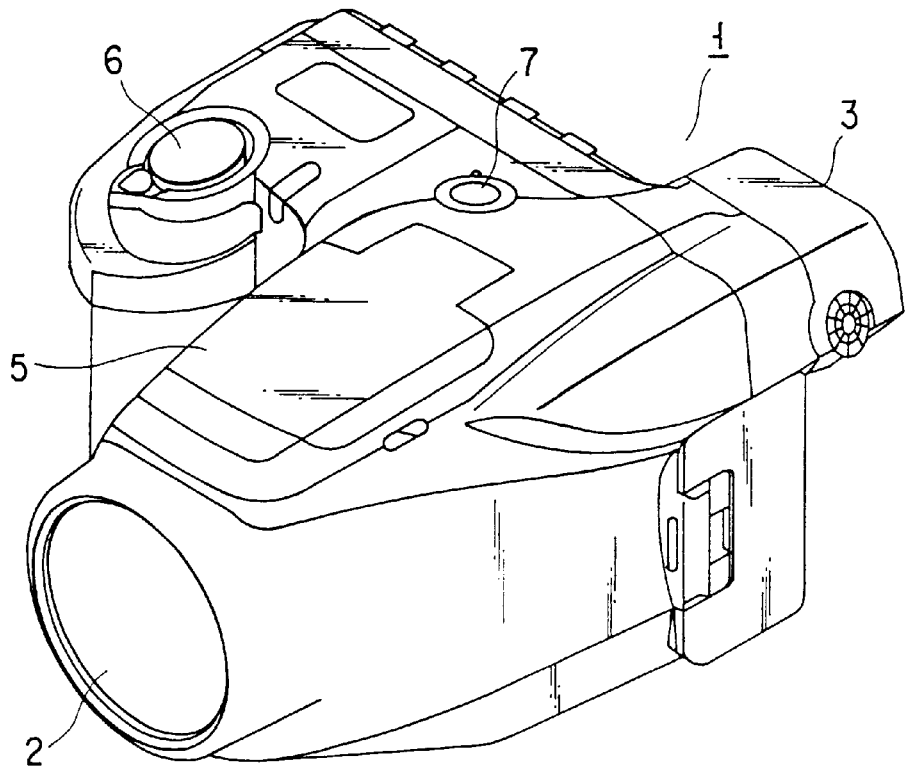
FIG. 1 is a front, perspective view of the outward appearance of a camera according to a first embodiment of the present invention.
Figure 2:
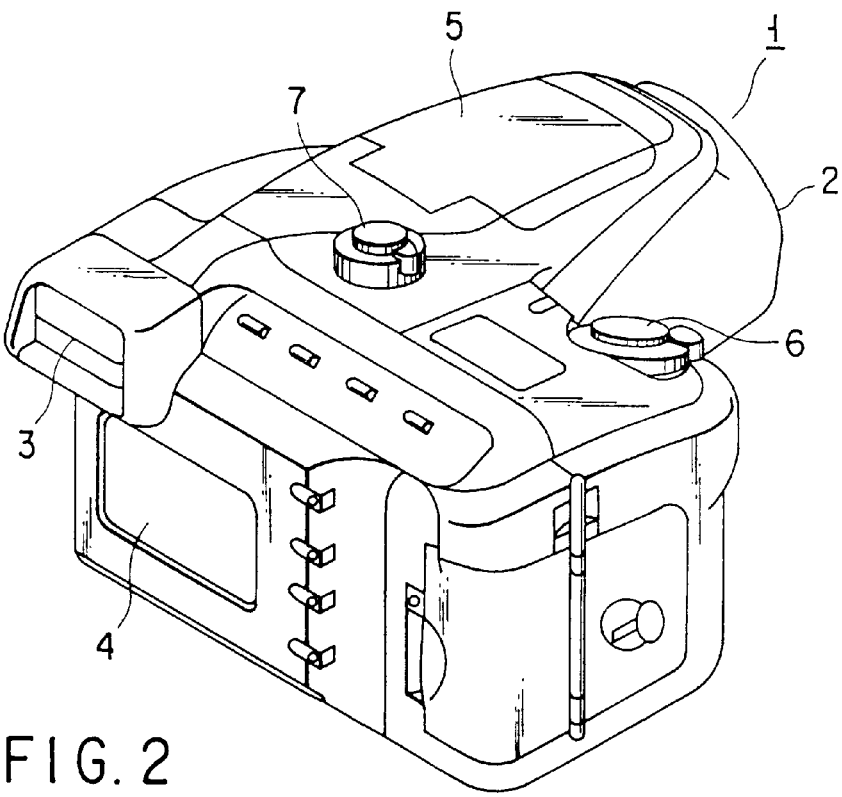
FIG. 2 is a back, perspective view of the outward appearance of the camera according to the first embodiment of the present invention.

In FIGS. 1 and 2, a reference numeral 1 indicates a camera body; 2, an optical system (including optical components such as a zoom lens); 3, a finder; 4, a liquid crystal monitor display; 5, a stroboscope; 6, a release button; and 7, a power switch. Hereinafter, the stroboscope 5, which is the main part of the present invention, will be described in detail.

Figure 3:
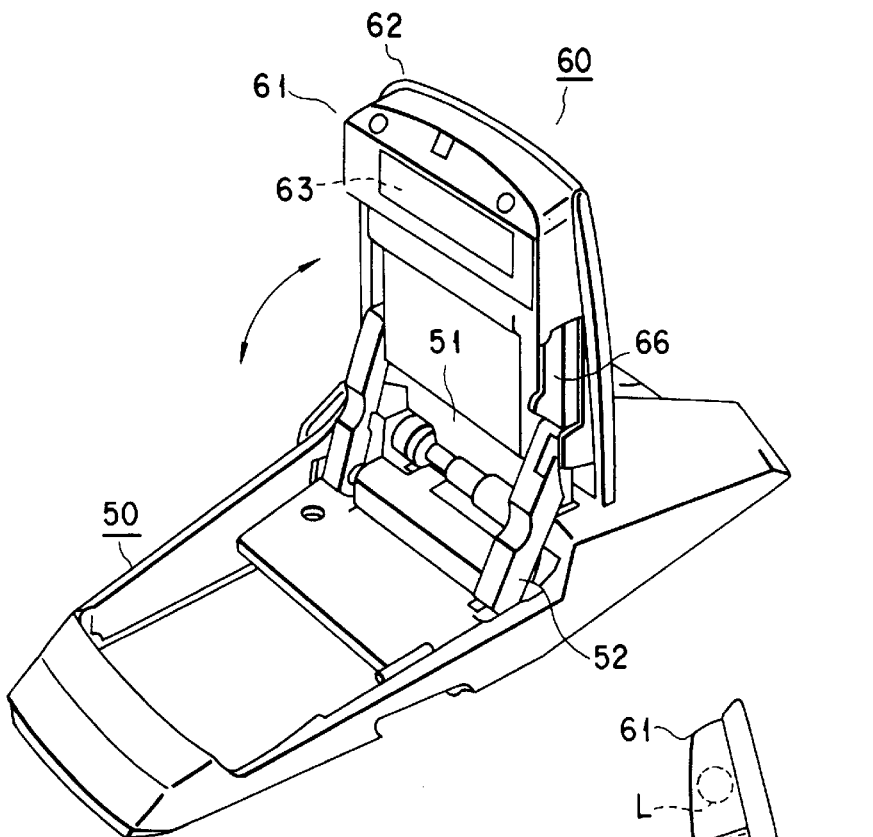
FIG. 3 is a perspective view of the outward appearance of a pop-up type stroboscope (with the cover opened) of the camera according to the first embodiment of the present invention.

FIG. 3 is a perspective view showing the outward appearance of a pop-up type stroboscope (with the cover opened). In FIG. 3, a reference numeral 50 denotes an attachment base, i.e., a part of the camera body 1, which is integrally screwed on the camera body 1. A cover unit 60 is attached to the attachment base so as to be rotatably opened and closed about a spindle 51. A stop member 52 is provided to prevent the cover unit 60 from rotating over a predetermined angle.

Figure 4:
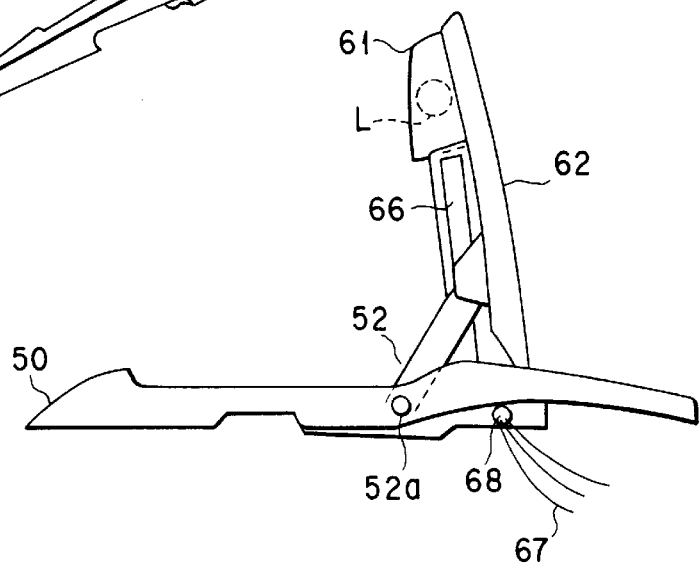
FIG. 4 is a side view showing the outward appearance of a pop-up type stroboscope (with the cover opened) of the camera according to the first embodiment of the present invention.
Figure 5:
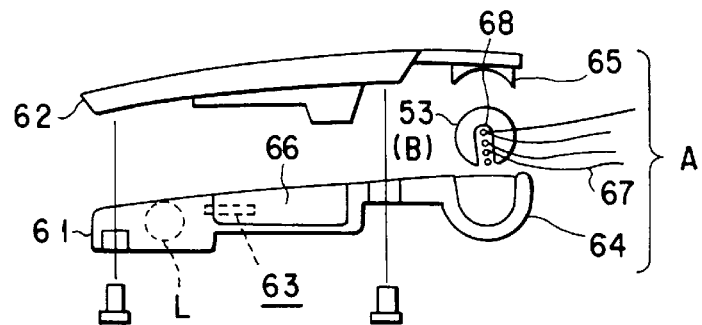
FIG. 5 is an exploded, side view showing the state in which the cover unit of the pop-up type stroboscope of the camera is divided into the inner and outer cover portions in the camera according to the first embodiment of the present invention.

As shown in FIGS. 4 and 5, the cover unit 60 is constituted by an inner cover 61 and an outer cover 62 integrally attached as a unit in a state where a xenon tube serving as a stroboscopic light emitting tube and electric circuit components 63, such as and a trigger transformer, are interposed between the inner and outer covers.

Contact portions 64 and 65, each having a semicircular surface brought into contact with a circumferential surface of a shaft portion 53 attached to the attachment base 50, are respectively formed in corresponding portions of proximal end portions on contact surfaces of the inner and outer covers 61 and 62. The pair of contact portions.64 and 65 rotatably support the circumferential surface of the shaft portion 53 (B) in two directions, i.e., from the upper and lower surface sides, thereby constituting a bearing portion (A).

One end 52a of the stop member 52 is rotatably supported by the attachment base 50, i.e., the camera body 1. Another end of the stop member 52 is set to be slidable along a guide groove 66 formed between the inner cover 61 and the outer cover 62, as the cover unit 60 is opened and closed.

Of the electric circuit components 63, the xenon tube L, i.e., a stroboscopic component, is incorporated in a top end portion of the cover unit 60, i.e., a pop-up type stroboscope. In other words, the xenon tube L is located at a position which is sufficiently distant from the photographing optical axis when the stroboscope is used.

As shown in FIGS. 4 to 7, lead lines 67 of the electric circuit components 63 are connected to an electric circuit within the camera body 1 through a path 68 coaxial with the spindle 51. It is preferable that the path 68, through which the lead lines 67 are passed, coincide with the center of rotation of the cover unit 60, i.e., the center of the axis of the spindle 51. Thus, the load by the lead lines 67 can be reduced.

Figure 6:
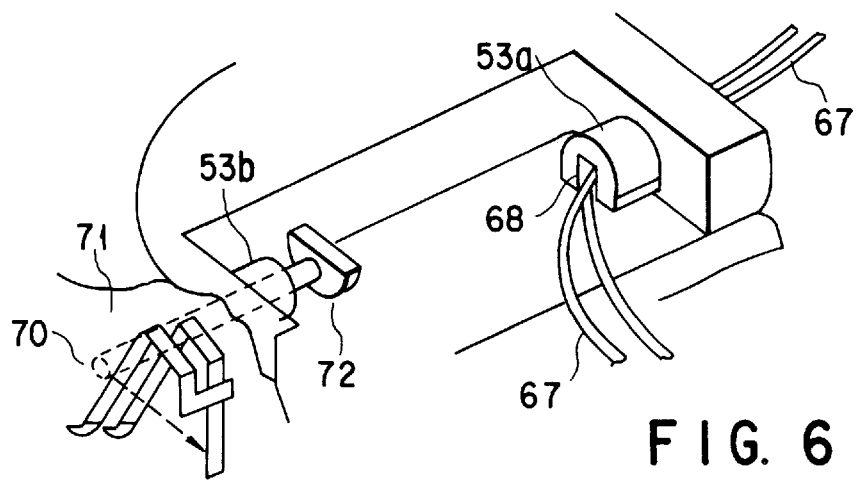
FIG. 6 is a perspective view of a main portion of the pop-up type stroboscope of the camera according to the first embodiment of the present invention.
Figure 7:
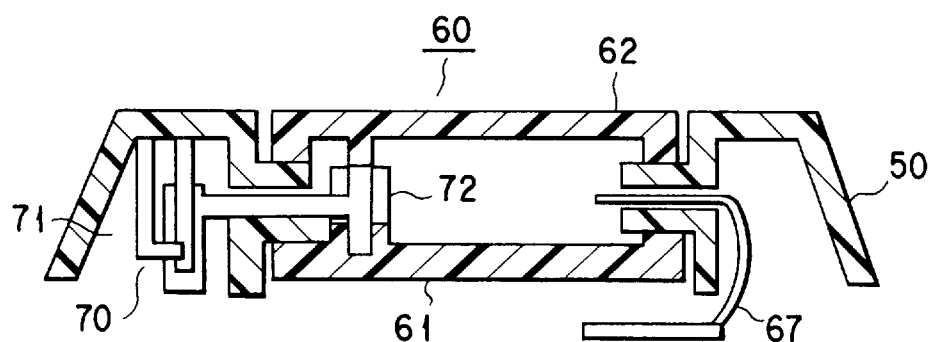
FIG. 7 is a cross-sectional view of a main portion of the pop-up type stroboscope of the camera according to the first embodiment of the present invention.

As shown in FIGS. 6 and 7, a detecting switch 70 for detecting a rotational position of the cover unit 60 is arranged in a space 71 formed beside a second shaft portion 53b located opposite to a first shaft portion 53a through which the lead lines 67 are passed. The detecting switch 70 is turned on and off by an operation lever 72 which is operated in cooperation with an opening/closing operation of the outer cover 62 by a leaf switch consisting of two contact strip-shaped pieces, made of conductive elastic material and brought into contact with or separated from each other.

Second Embodiment

Figure 8:
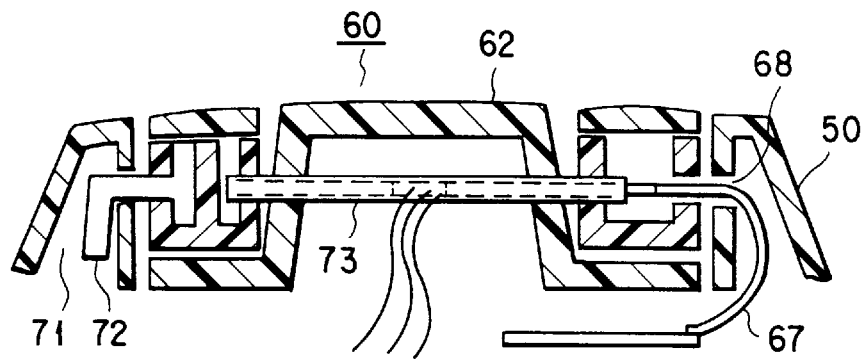
FIG. 8 is a cross-sectional view of the main portion of a pop-up type stroboscope of a camera according to a second embodiment of the present invention.

FIG. 8 shows a second embodiment in which a hollow shaft 73 is provided at the center of rotation of the cover unit 60. The other portions are the same as those of the above embodiment and detailed descriptions thereof are omitted. This embodiment can also work the present invention.

Modifications

The camera according to the embodiments can be modified as follows:

i) The spindle 51 is constituted by the combination of a bearing portion A provided in the camera body 1 and a shaft portion B provided in the cover unit 60.

ii) An LCD panel which requires a change in angle and electrical elements, such as an operation panel for an operation switch used with low frequency, are combined as a unit and mounted in the cover unit 60.

Features of the Embodiments

[1] A camera according to the embodiments comprises a camera body 1, a cover unit 60 attached to the camera body 1 so as to be rotatably opened and closed about a spindle 51, and a stop member 52 provided to prevent the cover unit 60 from rotating over a predetermined angle, wherein the cover unit 60 is constituted by an inner cover 61 and an outer cover 62 integrally attached as a unit in a state where electric circuit components 63 are interposed therebetween, and comprises a pair of contact portions 64 and 65, each having a semicircular surface brought into contact with a circumferential surface of a shaft portion 53 attached to the camera body 1, respectively formed in corresponding portions of contact surfaces of the inner and outer covers 61 and 62, the pair of contact portions 64 and 65 rotatably supporting a circumferential surface of the shaft portion 53 in two directions, thereby constituting a bearing portion A; and the stop member 52 has one end rotatably supported by the camera body 1 and another end set to be slidable along a guide groove 66 formed between the inner cover 61 and the outer cover 62.

According to the above camera, since both the inner cover 61 and the outer cover 62 have shapes adapted to a back-and-forth pulling type mold, the structures of the molds can be simple, effecting a reduction in costs. Since the camera can be assembled through simple processes and an engaging motion is not required, it can be assembled easily.

[2] In the camera according to the embodiments as described in above item [1], the spindle 51 is constituted by the combination of a bearing portion A provided on the camera body 1 and a shaft portion B provided on the cover body.

This camera provides substantially the same effect as that of the camera described in the preceding paragraph [1].

[3] In the camera according to the embodiments as described in above item [1] or [2], the electric circuit components 63 are stroboscopic components and the cover unit 60 is a pop-up type stroboscope.

In this camera, since the stroboscope is of a pop-up type, there is little restriction on the stroboscope mount surface of the camera body 1. Moreover, since the distance between the stroboscope and the photographing optical axis is sufficiently long, the "pink-eye effect" can be prevented.

[4] In the camera according to the embodiments as described in above item [1] or [3], lead lines 67 of the electric circuit components 63 are connected to an electric circuit within the camera body 1 through a path coaxial with the spindle 51.

In this camera, since the electric circuit components 63 are connected to the electric circuit of the camera body 1 through the lead lines 67 passed through the path in the spindle 51, the rotational resistance of the cover unit 60 due to the rigidity of the lead lines 67 is low and the lead lines 67 move little when the cover unit 60 is rotated. Therefore, a space for movement of the lead lines 67 is not required and the lead lines 67 may be as short as possible. Therefore, the cover unit 60 can be compact and the lead lines 67 can be short, and the reliability can be improved.

[5] In the camera according to the embodiments as described in above item [4], a detecting switch 70 for detecting a rotational position of the cover unit 60 is arranged in a space 71 provided outside a shaft portion 53b located opposite to a shaft portion 53a through which the lead lines 67 are passed.

According to this camera, since the lead lines 67 and the detecting switch 70 are arranged on the sides opposite to each other, they cannot interfere with each other and the camera can be assembled easily.

We claim:

1. A camera comprising:

a camera body;

a cover unit attached to the camera body so as to be rotatably opened and closed about a spindle; and a stop member provided to prevent the cover unit from rotating over a predetermined angle, wherein:

the cover unit is constituted by an inner cover and an outer cover integrally attached as a unit in a state where electric circuit components are interposed therebetween, and comprises a pair of contact portions, each having a semicircular surface brought into contact with a circumferential surface of a shaft portion attached to the camera body, respectively formed in corresponding portions of contact surfaces of the inner and outer covers, the pair of contact portions rotatably supporting a circumferential surface of the shaft portion in two directions, thereby constituting a bearing portion; and the stop member has an end rotatably supported by the camera body and another end set to be slidable along a guide groove formed between the inner cover and the outer cover.

2. The camera according to claim 1, wherein the spindle is constituted by combining a bearing portion provided in the camera body and a shaft portion provided in the cover unit.

3. The camera according to claim 1, wherein the electric circuit components are stroboscopic components and the cover unit is a pop-up type stroboscope.

4. The camera according to claim 2, wherein the electric circuit components are stroboscopic components and the cover unit is a pop-up type stroboscope.

5. The camera according to claim 1, wherein lead lines of the electric circuit components are connected to an electric circuit within the camera body through a path coaxial with the spindle.

6. The camera according to claim 3, wherein lead lines of the electric circuit components are connected to an electric circuit within the camera body through a path coaxial with the spindle.

7. The camera according to claim 4, wherein lead lines of the electric circuit components are connected to an electric circuit within the camera body through a path coaxial with the spindle.

8. The camera according to claim 5, wherein a detecting switch for detecting a rotational position of the cover unit is arranged in a space provided outside a shaft portion located opposite to a shaft portion of the spindle through which the lead lines are passed.

9. The camera according to claim 6, wherein a detecting switch for detecting a rotational position of the cover unit is arranged in a space provided outside the shaft portion located opposite to the shaft portion of the spindle through which the lead lines are passed.

10. The camera according to claim 7, wherein a detecting switch for detecting a rotational position of the cover body is arranged in a space provided outside the shaft portion located opposite to the shaft portion of the spindle through which the lead lines are passed.

* * * * *